US012091342B2

United States Patent
Ye et al.

(10) Patent No.: US 12,091,342 B2
(45) Date of Patent: Sep. 17, 2024

(54) METHOD AND DEVICE FOR REMOVING ORGANIC MICROPOLLUTANTS (OMPs) IN WATER

(71) Applicant: NANJING UNIVERSITY, Nanjing (CN)

(72) Inventors: Lin Ye, Nanjing (CN); Haohao Sun, Nanjing (CN); Xuxiang Zhang, Nanjing (CN); Kailong Huang, Nanjing (CN); Hongqiang Ren, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 436 days.

(21) Appl. No.: 17/603,230

(22) PCT Filed: Sep. 30, 2020

(86) PCT No.: PCT/CN2020/119242
§ 371 (c)(1),
(2) Date: Oct. 12, 2021

(87) PCT Pub. No.: WO2022/011847
PCT Pub. Date: Jan. 20, 2022

(65) Prior Publication Data
US 2022/0306503 A1   Sep. 29, 2022

(30) Foreign Application Priority Data
Jul. 13, 2020   (CN) .................. 202010669006.3

(51) Int. Cl.
*C02F 3/20*   (2023.01)
*C02F 1/00*   (2023.01)
(Continued)

(52) U.S. Cl.
CPC ............... *C02F 3/20* (2013.01); *C02F 1/006* (2013.01); *C02F 3/1205* (2013.01); *C02F 2001/007* (2013.01); *C02F 2101/30* (2013.01)

(58) Field of Classification Search
CPC   C02F 1/006; C02F 2001/007; C02F 2101/30; C02F 3/1205; C02F 3/20;
(Continued)

(56) References Cited

U.S. PATENT DOCUMENTS

| 2015/0353395 A1* | 12/2015 | Werker | ................ C02F 3/1263 210/601 |
| 2020/0062625 A1 | 2/2020 | Ohki et al. | |

FOREIGN PATENT DOCUMENTS

| CN | 101302068 A | 11/2008 |
| CN | 103936153 A | 7/2014 |

(Continued)

OTHER PUBLICATIONS

Liu et al. "Microbial community evolution in activated sludge during long-term aerobic starvation period", Journal of Harbin Institute of Technology, Aug. 1, 2019, pp. 20-27, vol. 51, No. 8.

*Primary Examiner* — Claire A Norris

(57) ABSTRACT

The present disclosure discloses a method and device for removing Organic Micropollutants (OMPs) in water, and belongs to the technical field of wastewater treatment. The method includes the following steps: S1: aerating residual sludge under a starvation condition to enrich starved-state microorganisms; and S2: treating wastewater containing OMPs under an aeration condition with sludge containing the starved-state microorganisms obtained in step S1, and periodically updating the sludge containing the starved-state microorganisms. According to the present disclosure, aerobic starvation treatment is performed on the sludge to gradually reduce the abundance of microorganisms that may use degradable organic matters only and enrich microorgan- (Continued)

isms that may use complex organic matters in the sludge, and the enriched sludge may degrade various OMPs and be used to remove OMPs in wastewater. The process is easy to operate and low in cost and has relatively high practical application value.

11 Claims, 3 Drawing Sheets

(51) Int. Cl.
*C02F 3/12* (2023.01)
*C02F 101/30* (2006.01)

(58) Field of Classification Search
CPC .......... C02F 2101/301; C02F 2101/303; C02F 2101/305; C02F 2101/306; C02F 2209/22; C02F 2209/44; C02F 3/006; C02F 3/121; C02F 3/1215; C02F 3/1236; Y02W 10/10
USPC ........................................................ 210/620
See application file for complete search history.

(56) References Cited

FOREIGN PATENT DOCUMENTS

| | | |
|---|---|---|
| CN | 105541021 A | 5/2016 |
| CN | 105621603 A | 6/2016 |
| CN | 107129046 A | 9/2017 |
| KR | 1020150126076 A | 11/2015 |

\* cited by examiner

METHOD AND DEVICE FOR REMOVING ORGANIC MICROPOLLUTANTS (OMPs) IN WATER

TECHNICAL FIELD

The present disclosure belongs to the technical field of wastewater treatment, and more particularly to a method and device for removing organic micropollutants (OMPs) in water.

BACKGROUND

Main sources of OMPs include drugs and personal care products, e.g., various pharmaceuticals, antibiotics, cosmetics and insecticides, and these products have been used extensively throughout the world. In recent years, OMPs have attracted more and more attentions due to their potential threats to aquatic environments and human health. Researches show that OMPs widely exist in aquatic environments in the world and are detected in surface water and groundwater in many places, with the concentration usually ranging from levels ng/L to mg/L. Many OMPs may be accumulated in living bodies and propagated and enriched through food chains to finally result in the chronic poisoning of animal or human tissues.

Most of OMPs are regarded as pseudo-persistent organic pollutants which may be slowly degraded in natural environments. However, they keep entering the environments through various channels and thus may cause the same risks to the environments as real persistent organic pollutants. At present, most of OMPs enter wastewater treatment plants through wastewater discharge systems and enter natural water before being completely degraded in wastewater treatment processes. Although OMPs are at low concentrations in environments, OMPs may still pollute water environments and damage the aquatic ecology, thereby affecting human health. In order to eliminate the potential risks of OMPs, it is necessary to remove OMPs in wastewater, besides conventional pollutants such as COD, nitrogen and phosphorus, before the wastewater is discharged to natural water.

In recent years, OMP removal capacities of various existing wastewater treatment processes (e.g., a conventional biological treatment process, a membrane bioreactor process, an activated carbon process, ultraviolet treatment, chlorination, and ozone oxidation) have been researched. Since OMPs have the characteristics of low concentration and resistance to biodegradation, OMP removal effects of conventional biological treatment (activated sludge) systems (e.g., an A/A/O process and an oxidation ditch process) applied most extensively to municipal wastewater treatment plants are not so good. It has been suggested by some researches that materials such as activated carbon, graphene and carbon nanotubes have good adsorption removal effects on OMPs. However, they are expensive and thus difficult to use on a large scale. It is also proved that OMPs may be removed by advanced oxidation processes such as ozone oxidation, Fenton oxidation, ultraviolet and chlorination. However, ultraviolet and chlorination processes, etc., have relatively poor OMP removal effects, while the other advanced oxidation processes are also difficult to popularize and use on a large scale due to the technical and economic cost and other factors.

The existence of ordinary organic matters in wastewater makes it difficult to facilitate the removal of OMPs by regulating and controlling secondary biological treatment processes of existing wastewater treatment systems. After wastewater is subjected to secondary biological treatment, ordinary organic matters are substantially exhausted, but there are still micropollutant residuals therein. Most of OMPs are difficult to biodegrade, and many microorganisms lack the ability of degradation, so it is necessary to develop a novel process technology to implement the efficient removal of OMPs.

SUMMARY

1. Problem to be Solved

A biological treatment process of a secondary treatment unit in an existing wastewater treatment system has a certain removal effect on part of OMPs. However, secondary treatment units of most of wastewater treatment systems are designed and operated to remove ordinary organic matters, nitrogen and phosphorus, while OMPs in wastewater are at a relatively low concentration and resistant to biodegradation, so OMPs cannot be removed efficiently under the condition of removing organic matters, nitrogen and phosphorus. In view of this problem, the present disclosure provides a method and device for removing OMPs in water. In the solution of the present disclosure, appropriate starvation treatment may be performed on aerobic microorganisms to enrich sludge with an efficient micropollutant degradation effect, and wastewater containing OMPs is treated with the enriched sludge, so that the matrix contention of simple carbon sources may be avoided on one hand, and on the other hand, the refractory OMPs may be degraded by the enriched sludge more efficiently to implement the efficient removal of the OMPs in the wastewater.

2. Technical Solutions

In order to solve the foregoing problem, the following technical solution is adopted in the present disclosure.

A method for removing OMPs in water includes the following steps:

S1: aerating residual sludge under a starvation condition to reduce the abundance of microorganisms that may use easily degradable organic matters only and enrich; and S2: treating wastewater containing OMPs under an aeration condition with sludge containing the starved-state microorganisms obtained in step S1, and periodically updating the sludge containing the starved-state microorganisms.

Preferably, aeration time in step S1 is 48 h to 72 h, and/or, dissolved oxygen is at least kept greater than 1 mg/L in 48 h. Since bacteria are enriched using complex organic matters in the sludge as carbon sources in the process, excessively short aeration time may make it impossible to enrich the sludge completely and result in a relatively poor micropollutant removal effect of the enriched sludge, and excessively long aeration time may cause the death of a lot of bacteria due to the lack of carbon sources and worsen the micropollutant removal effect. Therefore, controlling proper starvation aeration time is the key to the enrichment of functional floras. In addition, controlling the dissolved oxygen to be 1 mg/L or greater in step S1 is favorable for keeping an aerobic state. If the dissolved oxygen concentration is too low, the sludge may enter an anaerobic state, and the degradation effect of the obtained enriched sludge is relatively poor. If the dissolved oxygen concentration is too high, energy may be wasted.

Preferably, since a low organic load cannot keep the sludge in step S2 available for long, the sludge in step S2 is required to be periodically replaced. A replacement cycle of the sludge in step S2 is 5 days to 7 days.

Preferably, a sludge concentration in step S1 is in a range of 7,000 mg/L to 10,000 mg/L. If the sludge concentration is too low, the volume of a sludge aeration tank is required to be larger, which brings unnecessary waste. If the sludge concentration is too high, the fluidization of the sludge under an aerobic condition may be affected, the aerobic state cannot be kept, and furthermore, the micropollutant removal effect of the enriched sludge is not so good. And/or, a sludge concentration in step S2 is controlled in a range of 2,000 mg/L to 3,000 mg/L. If the sludge concentration is too low, the treatment efficiency in step S2 may be reduced. An excessively high sludge concentration is unfavorable for subsequent sludge sedimentation, and an excessively low organic load is unfavorable for keeping the long-term stable running of a reactor.

Preferably, since there is an upper limit for a micropollutant removal capacity of the seeding starved sludge, for balancing the micropollutant removal rate and the wastewater treatment capacity of the process, hydraulic retention time for the treatment of the wastewater containing the OMPs in step S2 is 10 h to 15 h. The micropollutant removal rate and the wastewater treatment capacity are ensured at the same time.

Preferably, the OMPs include bisphenol AF and/or gabapentin.

The present disclosure also provides a device for removing OMPs in water, including:

a sludge aeration tank configured to periodically provide aerobic starved sludge, a wastewater aeration tank configured to treat wastewater containing OMPs and a sedimentation tank, which are connected in sequence;

a residual sludge pipe configured to deliver residual sludge of a secondary sedimentation tank of an ordinary activated sludge process to the sludge aeration tank;

an enriched sludge pipe configured to periodically deliver sludge obtained by the sludge aeration tank by aerobic starvation treatment to the wastewater aeration tank;

a water inlet pipe configured to deliver the wastewater containing the OMPs to the wastewater aeration tank for treatment; and a wastewater aeration tank water outlet pipe configured to discharge a sludge-wastewater mixture in the wastewater aeration tank to the sedimentation tank.

Further, the device further includes: a sedimentation tank sludge return pipe configured to cause sedimented sludge in the sedimentation tank to return to the wastewater aeration tank;

a sludge discharge pipe configured to discharge the sludge sedimented by the sedimentation tank from a system after a replacement cycle of the sludge in the wastewater aeration tank (2) is reached; and a water outlet pipe configured to discharge a supernatant in the sedimentation tank from the system.

The residual sludge is aerated by the sludge aeration tank under a starvation condition to obtain seeding sludge of the wastewater aeration tank, and the wastewater containing the OMPs is treated by the wastewater aeration tank to remove the OMPs in the wastewater. Since an organic load of wastewater containing micropollutants is usually low and cannot keep the sludge in the wastewater aeration tank available for long, the sludge aeration tank is required to regularly provide starved sludge to replace the sludge in the wastewater aeration tank.

Preferably, in order to meet the requirement (2,000 mg/L to 3,000 mg/L) of the wastewater aeration tank on the sludge concentration, a volume ratio of the wastewater aeration tank to the sludge aeration tank is less than 3.

3. Beneficial Effects

Compared with the prior art, the present disclosure has the following beneficial effects.

(1) According to a conventional method, sludge is usually enriched using target pollutants to obtain functional floras capable of degrading the target pollutants. However, in this process, the addition of the target pollutants may cause the increase of the cost and additional pollutions, and acclimated sludge may usually degrade the target pollutants and has low practical application value. Main ingredients of the sludge are organic matters, mainly including complex biodegradation-resistant organic matters such as microorganisms and secretions thereof. In the present disclosure, aerobic starvation treatment is performed on the sludge to gradually eliminate microorganisms that may use degradable organic matters only and enrich microorganisms that may use complex organic matters in the sludge, and the enriched sludge may degrade various OMPs and be used to remove OMPs in wastewater. The process is easy to operate and low in cost and has relatively high practical application value.

(2) In the present disclosure, the organic matters in the sludge are consumed by the microorganisms during the starvation aeration of the sludge aeration tank, so that the sludge concentration is reduced rapidly, and the amount of the sludge is reduced to a certain extent. Therefore, the residual sludge treatment cost of a wastewater treatment plant is reduced.

(3) In the present disclosure, the residual sludge is aerated under the starvation condition, and the aeration time is controlled to 48 h to 72 h, so that a relatively good effect of the obtained starved-state microorganisms on the OMPs may be ensured.

(4) In the present disclosure, since a low organic load cannot keep the aerobic starved sludge in step S2 available for long, the sludge in step S2 is required to be periodically replaced. The treatment capacity of the aerobic starved sludge may be reduced to a certain extent 5 days to 7 days later by the time the wastewater containing the OMPs is treated, so the replacement cycle is set to 5 days to 7 days.

(5) The device for removing the OMPs in water in the present disclosure may treat the wastewater containing the OMPs effectively through the aerobic starved sludge. The sludge return pipe is further arranged to cause the sedimented sludge in the sedimentation tank to return to the sedimentation tank of the wastewater aeration tank to ensure the sludge concentration in the wastewater aeration tank and help to maintain the treatment capacity.

In the figure: 1—sludge aeration tank; 2—wastewater aeration tank; 3—sedimentation tank; 4—residual sludge pipe; 5—enriched sludge pipe; 6—water inlet pipe; 7—wastewater aeration tank water outlet pipe; 8—sedimentation tank sludge return pipe; 9—water outlet pipe; and 10—sludge discharge pipe.

Figure 2:
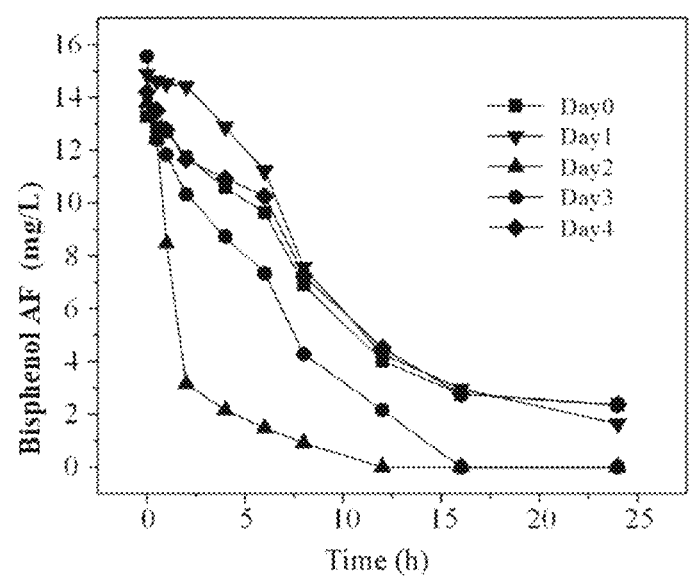

FIG. 2 illustrates a kinetic curve of degradation of bisphenol AF by sludge in a sludge aeration tank according to embodiment 1.

Figure 3:
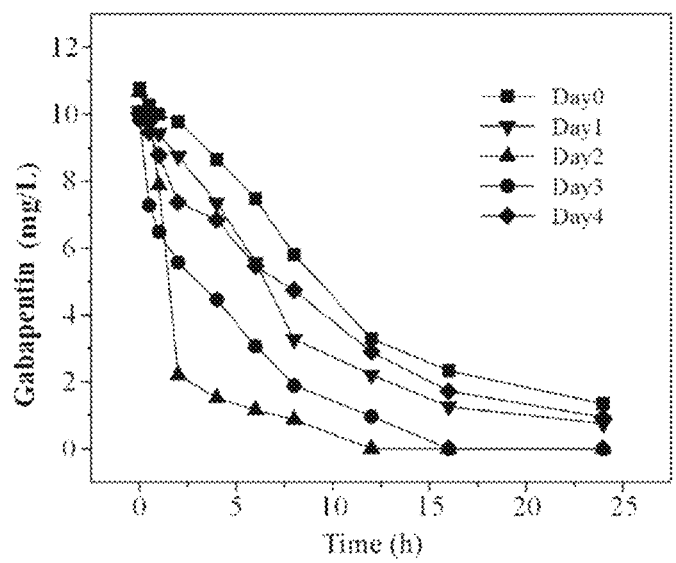

FIG. 3 illustrates a kinetic curve of degradation of gabapentin by sludge in a sludge aeration tank according to embodiment 1.

Figure 4:
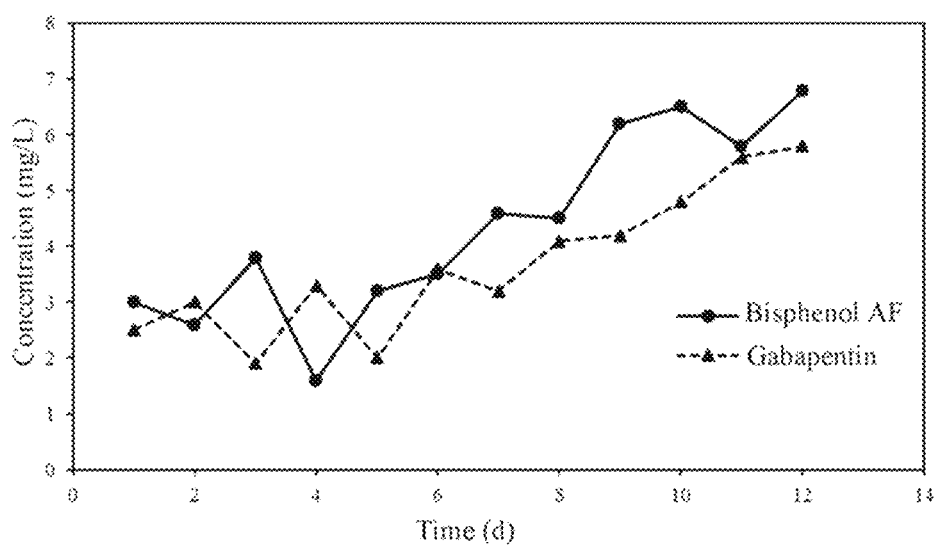

FIG. 4 illustrates a removal effect of a continuous flow reactor taking enriched sludge as seeding sludge on wastewater containing micropollutants bisphenol AF and gabapentin according to embodiment 2.

Figure 5:
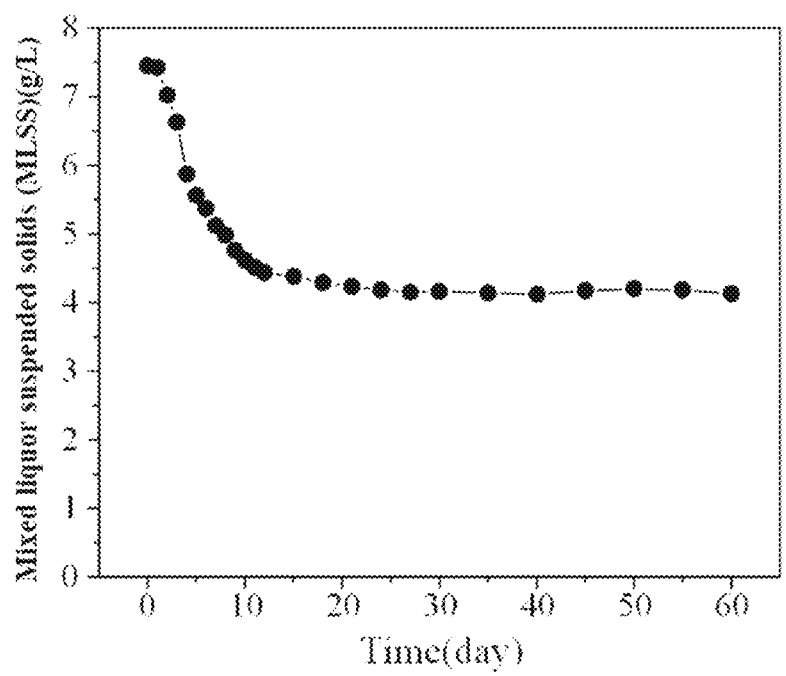

FIG. 5 illustrates a change rule of a sludge concentration in an aerobic starvation process according to embodiment 3.

DETAILED DESCRIPTION

Unless otherwise defined, all technical and scientific terms used herein have the same meaning as commonly understood by a person skilled in the technical field of the present disclosure. The term "and/or" as used herein includes any and all combinations of one or more related listed items.

If specific conditions are not indicated in the embodiments, it shall be carried out in accordance with the conventional conditions or the conditions recommended by the manufacturer. The reagents or instruments for which no manufacturers are noted are all common products commercially available from the market.

As used herein, the term "about" is used to provide flexibility and imprecision related to a given term, metric, or value. A person skilled in the art may easily determine the degree of flexibility of specific variables.

The concentrations, amounts, and other values are presented in a range format herein. It should be understood that such a range format is used only for convenience and brevity, and should be flexibly interpreted as including not only the values explicitly stated as the limits of the range, but also all individual values or subranges covered within the range, as if each value and subrange are explicitly stated. For example, a numerical range of about 48 to about 72 should be explained as not only including the clearly described limit values 48 to about 72 but also including independent numbers (e.g., 50, 55 and 70) and sub-ranges (e.g., 50 to 70). The same principle is suitable for describing a range involving only one numerical value. For example, "less than about 72" should be explained as including all abovementioned values and ranges. In addition, this explanation is suitable for all ranges or features regardless of the breadths thereof.

The present disclosure will be further described below with reference to specific embodiments.

Figure 1:
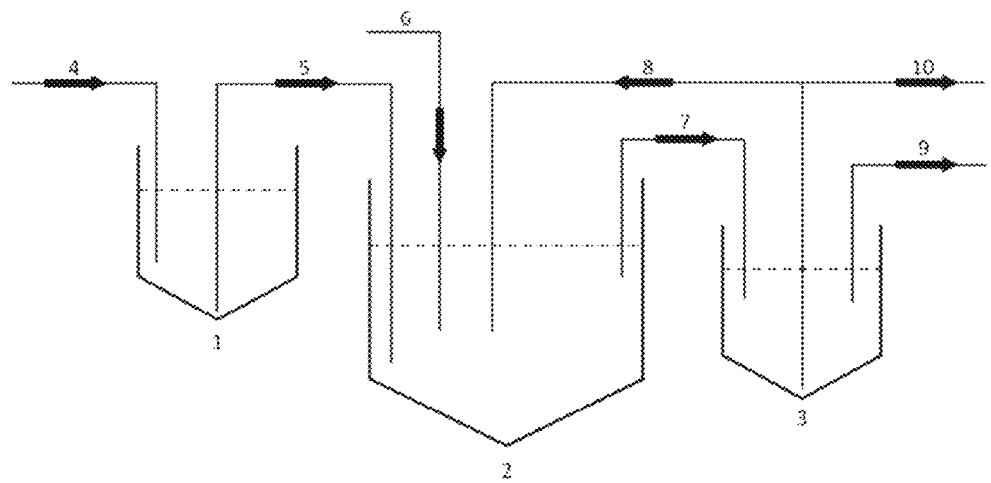
FIG. 1 is a schematic diagram of a device for removing OMPs in water according to the present disclosure.

As shown in FIG. 1, a device for removing OMPs in wastewater consists of a sludge aeration tank 1, a wastewater aeration tank 2 and a sedimentation tank 3, which are connected through a pipeline. A residual sludge pipe 4 delivers residual sludge of a secondary sedimentation tank to the sludge aeration tank 1. Sludge containing starved-state microorganisms obtained by the sludge aeration tank 1 by aeration under a starvation condition is periodically delivered to the wastewater aeration tank 2 by an enriched sludge pipe 5. A water inlet pipe 6 delivers wastewater containing OMPs to the wastewater aeration tank 2. A sludge-wastewater mixture in the wastewater aeration tank 2 is discharged to the sedimentation tank 3 by a wastewater aeration tank water outlet pipe 7 after the wastewater is treated with the starved-state microorganisms in the wastewater aeration tank 2 under an aeration condition and stays for specific time. Sedimented sludge in the sedimentation tank 3 periodically returns to the wastewater aeration tank 2 through a sedimentation tank sludge return pipe 8, and a supernatant is discharged by a water outlet pipe 9. After a replacement cycle of the sludge in the wastewater aeration tank 2 is reached, the sludge is discharged from a system by a sludge discharge pipe 10 after sedimented by the sedimentation tank 3. A sludge discharge cycle is the same as a cycle of periodically delivering sludge from 1.

The residual sludge is aerated by the sludge aeration tank 1 under the starvation condition to obtain seeding sludge of the wastewater aeration tank 2, and the wastewater containing the OMPs is treated by the wastewater aeration tank 2 to remove the OMPs in the wastewater. Since an organic load of the wastewater containing the OMPs is usually low and cannot keep the sludge in the wastewater aeration tank 2 available for long, the sludge aeration tank 1 is required to regularly provide starved sludge to replace the sludge in the wastewater aeration tank 2.

A sludge concentration in the sludge aeration tank 1 is controlled in a range of 7,000 mg/L to 10,000 mg/L. Aeration time in the sludge aeration tank 1 is required to be controlled in a range of 48 h to 72 h. Dissolved oxygen in the sludge aeration tank 1 is required to be controlled to be 1 mg/L or greater. If the dissolved oxygen concentration is too low, the sludge may enter an anaerobic state, and the degradation effect of the obtained enriched sludge is relatively poor. If the dissolved oxygen concentration is too high, energy may be wasted. A sludge concentration in the wastewater aeration tank 2 is controlled in a range of 2,000 mg/L to 3,000 mg/L.

Since a low organic load cannot keep the sludge in the wastewater aeration tank 2 available for long, the sludge in the wastewater aeration tank 2 is required to be periodically replaced. A replacement cycle of the sludge is 5 days to 7 days. In order to achieve a relatively good micropollutant removal effect, hydraulic retention time in the wastewater aeration tank 2 is controlled in a range of 10 to 15 h. In order to meet the requirement of the wastewater aeration tank 2 on the sludge concentration, a volume ratio of the wastewater aeration tank 2 to the sludge aeration tank 1 is less than 3.

Embodiment 1

In this embodiment, residual sludge of a wastewater treatment plant (a municipal wastewater treatment plant in Nanjing) at a sludge concentration of about 7,500 mg/L is aerated as seeding sludge of a sludge aeration tank 1 without any additional nutrient, with the dissolved oxygen kept at 1.5 mg/L or greater. The sludge at different time points (days 0, 1, 2, 3 and 4, namely when aeration time reaches 0 h, 24 h, 48 h, 72 h and 96 h) in an aeration treatment process is selected for OMP degradation kinetics experiments. The sludge concentration in a wastewater aeration tank 2 is made 2,000 mg/L to 3,000 mg/L. Bisphenol AF and gabapentin are used as an only carbon source respectively, at the concentration of 10 mg/L. Other ingredients are further included: 5 mg L−1 $KH_2PO_4$, 5 mg L−1 $NH_4Cl$, 22.5 mg L−1 $MgSO_4 \cdot 7H_2O$ and 27.5 mg L−1 $CaCl_2$).

Experimental results are shown in FIG. 2 (bisphenol AF, 10 mg/L) and FIG. 3 (gabapentin, 10 mg/L). The sludge obtained by aeration for 2 days (Day 2, 48 h) in the sludge aeration tank 1 has the highest degradation capacity for bisphenol AF and gabapentin, and the sludge obtained by aeration for 3 days (Day 3, 72 h) has the second highest degradation capacity for bisphenol AF and gabapentin. This is probably because sludge obtained by enriching bacteria taking complex nondegradable organic matters in the sludge as a carbon source under the starvation condition has a relatively high OMP degradation capacity for bisphenol AF and gabapentin. Aerobic starvation remarkably improves the degradation capacity of the sludge for some micropollutants, but requires the aeration time of the sludge to be controlled because limited organic matters in the sludge may be used for microorganisms and excessively long starvation time may cause the death of functional floras. The experimental results show that relatively appropriate aeration time is usually about 48 h to 72 h, and if retention time is 10 h to 15 h or greater under this condition, the concentrations of bisphenol AF and gabapentin may be reduced to be 1 mg/L or less respectively.

Embodiment 2

The sludge obtained by aeration for 2 days in the sludge aeration tank 1 is selected as seeding sludge in the wastewater aeration tank 2 (the sludge concentration is about 2,500 mg/L) to continuously treat wastewater containing OMPs to research the OMP removal effect of sludge enriched by aeration. As shown in FIG. 4, experimental results show that the sludge enriched by aeration has a relatively good removal effect on the OMPs in the wastewater, but the effect may be kept for only about 7 days. The sludge in the wastewater aeration tank 2 may be regularly replaced according to the requirement on the concentration of the OMPs under a practical working condition. A suggested replacement cycle is 5 days to 7 days.

Embodiment 3

The residual sludge of the wastewater plant in embodiment 1 is aerated under the starvation condition, with the dissolved oxygen concentration kept at 1 mg/L or greater. Sludge amount data obtained in 60 days is shown in FIG. 5. Results show that starvation aeration treatment gradually reduces the sludge concentration and the sludge concentration is kept at about 4,000 mg/L after 25 days. Therefore, starvation aeration may reduce the amount of the sludge to a certain extent to further reduce the treatment cost of the residual sludge. The reduction of the amount of the sludge indicates that complex organic matters in the sludge may be used for microorganisms, thereby implementing the acclimation enrichment of the microorganisms. This is also probably because a starvation aeration process may improve the OMP degradation capacity of the sludge.

The foregoing description is merely a schematic description of the present disclosure and implementations thereof, and is not restrictive. The accompanying drawings merely show one of the implementations of the present disclosure, and the actual structure/implementation is not limited thereto. Therefore, similar structures and embodiments designed by a person of ordinary skill in the art as inspired by the disclosure herein without departing from the spirit of the present disclosure and without creative efforts shall fall within the protection scope of the present disclosure.

What is claimed is:

1. A method for removing Organic Micropollutants (OMPs) in water, comprising the following steps:
    S1: aerating residual sludge for 48 h to 72 h under a starvation condition to reduce the abundance of microorganisms that may use degradable organic matters only and enrich starved-state microorganisms that may use complex organic matters in the sludge; and
    S2: treating wastewater containing OMPs under an aeration condition with sludge containing the starved-state microorganisms obtained in step S1, and replacing the sludge containing the starved-state microorganisms every 5 days to 7 days.

2. The method for removing the OMPs in water according to claim 1, wherein dissolved oxygen is kept at least 1 mg/L over 48 h in Step S1.

3. The method for removing the OMPs in water according to claim 1, wherein a mixed liquor suspended solids concentration in step S1 is in a range of 7,000 mg/L to 10,000 mg/L; and/or, a mixed liquor suspended solids concentration in step S2 is controlled in a range of 2,000 mg/L to 3,000 mg/L.

4. The method for removing the OMPs in water according to claim 1, wherein hydraulic retention time for the treatment of the wastewater containing the OMPs in step S2 is 10 h to 15 h.

5. The method for removing the OMPs in water according to claim 1, wherein a device is used for removing Organic Micropollutants (OMPs) in water, the device comprising:
    a sludge aeration tank (1) configured to periodically provide the sludge containing the starved-state microorganisms, a wastewater aeration tank (2) configured to treat the wastewater containing OMPs, and a sedimentation tank (3), which are connected in sequence;
    a residual sludge pipe (4) configured to deliver residual sludge of a secondary sedimentation tank of an ordinary activated sludge process to the sludge aeration tank (1);
    an enriched sludge pipe (5) configured to periodically deliver the sludge containing the starved-state microorganisms obtained by the sludge aeration tank (1) by aerobic starvation treatment to the wastewater aeration tank (2);
    a water inlet pipe (6) configured to deliver the wastewater containing the OMPs to the wastewater aeration tank (2) for treatment; and
    a wastewater aeration tank water outlet pipe (7) configured to discharge a sludge-wastewater mixture in the wastewater aeration tank (2) to the sedimentation tank (3),
    wherein the sludge containing starved-state microorganisms obtained by the sludge aeration tank (1) by aeration for 48-72 hours under the starvation condition is delivered to the wastewater aeration tank (2) every 5-7 days by the enriched sludge pipe (5), and
    wherein the sludge-wastewater mixture in the wastewater aeration tank (2) is discharged to the sedimentation tank (3) by the wastewater aeration tank water outlet pipe (7) after the wastewater is treated with the starved-state microorganisms in the wastewater aeration tank (2) under an aeration condition and stays for specific time.

6. The method for removing the OMPs in water according to claim 5, wherein the device further comprises:
    a sedimentation tank sludge return pipe (8) configured to cause sedimented sludge in the sedimentation tank (3) to periodically return to the wastewater aeration tank (2);
    a sludge discharge pipe (10) configured to discharge the sludge sedimented by the sedimentation tank (3) from the device, after a replacement cycle of the sludge in the wastewater aeration tank (2) is reached; and
    a water outlet pipe (9) configured to discharge a supernatant in the sedimentation tank (3) from the device.

7. The method for removing the OMPs in water according to claim 5, wherein a volume ratio of the wastewater aeration tank (2) to the sludge aeration tank (1) is less than 3.

8. The method for removing the OMPs in water according to claim 6, wherein a volume ratio of the wastewater aeration tank (2) to the sludge aeration tank (1) is less than 3.

9. The method for removing the OMPs in water according to claim 2, wherein hydraulic retention time for the treatment of the wastewater containing the OMPs in step S2 is 10 h to 15 h.

10. The method for removing the OMPs in water according to claim 1, wherein hydraulic retention time for the treatment of the wastewater containing the OMPs in step S2 is 10 h to 15 h.

11. The method for removing the OMPs in water according to claim 3, wherein hydraulic retention time for the treatment of the wastewater containing the OMPs in step S2 is 10 h to 15 h.

* * * * *